United States Patent
Liu et al.

(10) Patent No.: US 7,085,612 B2
(45) Date of Patent: Aug. 1, 2006

(54) SYSTEM AND METHOD FOR IDENTIFYING SEMICONDUCTOR PROCESS STEPS FOR QUEUE-TIME CONTROL AND ABNORMALITY DETECTION

(75) Inventors: Chia-Chun Liu, Hsin-Chu (TW);
Chih-Yuan Chang, Banqiao (TW);
Chih-Hung Wu, Taipei (TW);
Kuo-Rong Hsiao, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 265 days.

(21) Appl. No.: 10/823,872

(22) Filed: Apr. 14, 2004

(65) Prior Publication Data

US 2005/0234578 A1 Oct. 20, 2005

(51) Int. Cl.
*G06F 19/00* (2006.01)
(52) U.S. Cl. .......................... 700/91; 700/95; 700/121; 714/47
(58) Field of Classification Search .................. 700/91, 700/95, 117, 121; 714/47
See application file for complete search history.

(56) References Cited

U.S. PATENT DOCUMENTS

| 5,665,199 | A | * | 9/1997 | Sahota et al. ............... 438/14 |
| 5,880,960 | A |   | 3/1999 | Lin et al. |
| 6,134,482 | A |   | 10/2000 | Iwasaki |
| 6,243,612 | B1 |   | 6/2001 | Rippenhagen et al. |
| 6,766,283 | B1 | * | 7/2004 | Goldman et al. ............. 703/2 |
| 2003/0058909 | A1 | * | 3/2003 | Benyon ....................... 372/43 |

* cited by examiner

*Primary Examiner*—Jayprakash N. Gandhi
(74) *Attorney, Agent, or Firm*—Haynes and Boone, LLP (57) ABSTRACT

A computer-implemented method and system for identifying process steps for purposes of queue-time control and abnormality detection is provided. In one example, the method includes retrieving manufacturing information associated with a fabrication process, where the manufacturing information includes multiple process step pairs. The manufacturing information may be divided into at least a high group and a low group using a statistical clustering method. Values, such as P-values, may then be calculated for each process step pair by applying a non-parametric statistical method to the high and low groups. The process step pairs may be ranked based on their calculated values, and redundant process step pairs may be eliminated. The remaining process step pairs may then be analyzed to identify a particular process step or process step pair.

25 Claims, 5 Drawing Sheets

SYSTEM AND METHOD FOR IDENTIFYING SEMICONDUCTOR PROCESS STEPS FOR QUEUE-TIME CONTROL AND ABNORMALITY DETECTION

FIELD OF TECHNOLOGY

The present disclosure relates generally to the field of semiconductor manufacturing and, more particularly, to a system and method for identifying and implementing queue-time control in a semiconductor manufacturing environment.

BACKGROUND

Semiconductor manufacturing is a relatively complex process that may utilize hundreds of steps to produce a semiconductor device or a batch of such devices. Each step may include masking, photolithography, etching, rinsing, etc., each of which may be a single process or which may involve multiple processes. The time needed to produce such devices may involve several months. Due in part to the number of steps and the amount of time used to produce a semiconductor device, mistakes or errors occurring during processing may be difficult to isolate.

Accordingly, what is needed in the art is a system and method thereof that addresses the above discussed issues.

DETAILED DESCRIPTION

The present disclosure relates generally to the field of semiconductor manufacturing and, more particularly, to a system and method for identifying and implementing queue-time control in a semiconductor manufacturing environment. It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
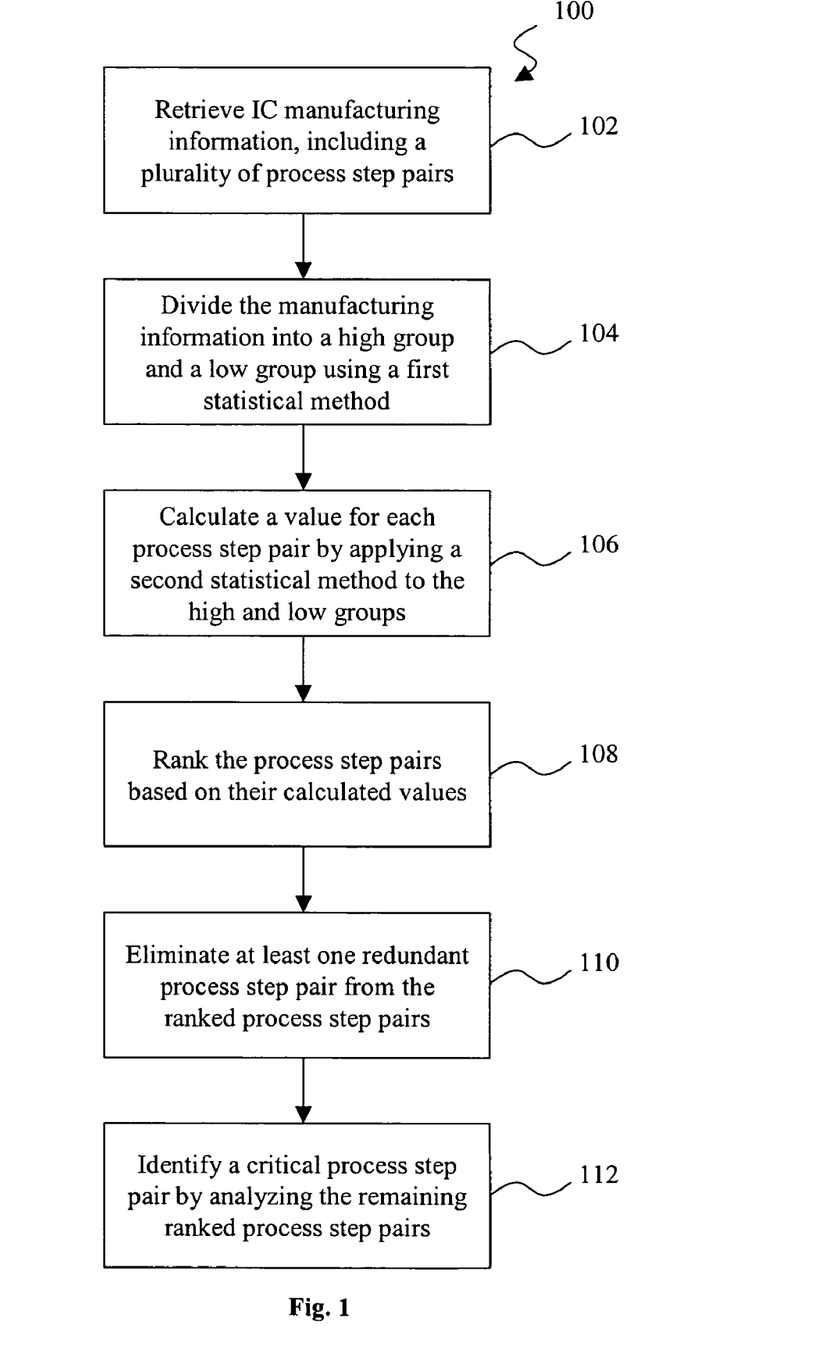
FIG. 1 is a flow chart of an exemplary method for identifying semiconductor process steps for queue-time control and abnormality detection.

Referring to FIG. 1, a method 100 illustrates one embodiment of a process that may be used to identify critical process steps for queued-time control and abnormality detection in a semiconductor manufacturing environment. Semiconductor manufacturing generally implements a time window (e.g., a queue time) between processes. The selected time window may affect the materials applied to a semiconductor substrate, as well as electrical properties of a device being formed. The queue time may represent the time difference between a first time when a product (e.g., a wafer or lot) leaves a process step and a second time when the product enters the next process step. The control of this time may be referred to as queue time control. The control of the queue time may be implemented for known time-sensitive process steps that are commonly discovered by experimentation or that are based on the general knowledge of the manufacturer (e.g., through experience). However, due to the hundreds of process control steps that may be used to manufacture a semiconductor device, there may exist many processes wherein queue time control should be implemented, but in which it is not currently implemented. These steps may be referred to as "critical" steps.

As will be described later in greater detail with a specific example, the method 100 may be used to aid in identifying such steps. In step 102, manufacturing information associated with a fabrication process may be retrieved. The manufacturing information may include device functional yield (e.g., yield information associated with a lot/wafer), electrical characteristics, materials characteristics, and similar information. The electrical characteristics may include resistance, capacitance, and current-voltage characteristics provided through electrical test structures embedded in the product. For example, an electrical test structure may exist for contact resistance, wherein the contact resistance may provide an indicator of the quality of the process steps associated with the contact resistance. This information may be retrieved based on predefined sample parameters, such as a window size that encompasses a specified number of process steps. In the present example, the manufacturing information includes process step pairs (e.g., a pair of process steps which may be sequential, but may include intervening process steps). In step 104, the retrieved manufacturing information may be sorted using a first statistical method (e.g., a statistical sorting method such as analysis of variance (ANOVA) or multivariate analysis of variance (MANOVA)) that divides the manufacturing information into at least a high group and a low group.

In step 106, a value may be calculated for each process step pair by applying a statistical method (e.g., a statistical significance method) to the high and low groups. The statistical significance method may be applied to the sorted data to determine a statistical significance of various groups, and may generate a value for each process step pair indicating a significance of the process step pair relative to the others with respect to a queue time event. For example, the values may represent P-values, which may be determined through a statistical test such as the Kruskal-Wallis test and/or other statistical tests.

In step 108, the process step pairs may be ranked based on their calculated values. In step 110, at least one redundant process step pair may be eliminated from the ranked process step pairs. As will be described later in greater detail, such elimination may be accomplished using a trimming treatment that calculates a referral score for each process step pair, ranks the process step pairs based on the referral score, and then identifies and removes redundant process step pairs. In step 112, a critical process step or process step pair may be identified by analyzing the remaining ranked process step pairs. Accordingly, the method 100 may aid in isolating one or more process step pairs from a large number of process steps.

Figure 2:
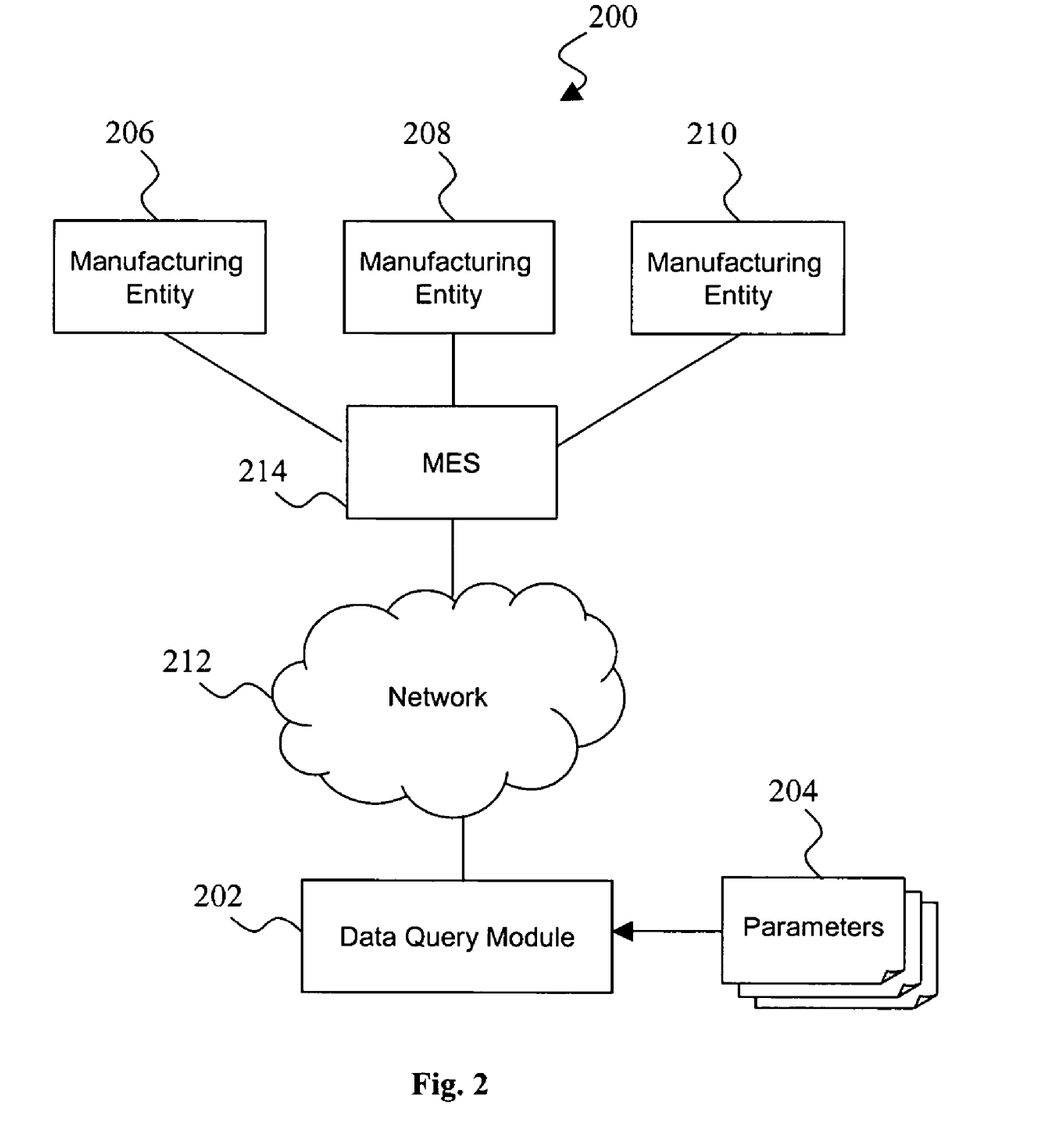
FIG. 2 illustrates a schematic view of one embodiment of a system within which the method of FIG. 1 may be executed.

Referring to FIG. 2, an exemplary semiconductor manufacturing environment 200 within which the method 100 of FIG. 1 may be executed is illustrated. The environment 100 includes a data query module 202 stored on a computer or similar device (not shown). The data query module 202 is configured to execute software instructions and to retrieve data using parameters 204. The data query module 202 may also execute software instructions to perform the method 100, which may aid in the identification of a critical process step.

The data may be retrieved from one or more manufacturing entities 206, 208, 210 (e.g., processes, tools, etc.) via a network 212. The parameters 204 may identify a step window size, the manufacturing entities from which the data is to be retrieved, and similar information. In the present example, the data is retrieved from a manufacturing execution system (MES) 214, which may be an integrated computer system representing methods and tools used to accomplish production of a semiconductor device through the manufacturing entities. For example, the MES 214 may collect data in real time, organize and store the data in a centralized database, and perform operations related to work order management, workstation management, process management, inventory tracking, and document control. It is understood that the MES may incorporate different technologies, such as PROMIS (Brooks Automation Inc. of Massachusetts), WORKSTREAM (Applied Materials, Inc. of California), POSEIDON (IBM Corporation of New York), MIRL-MES (Mechanical Industry Research Laboratories of Taiwan), and/or a Petri net.

Figure 3:
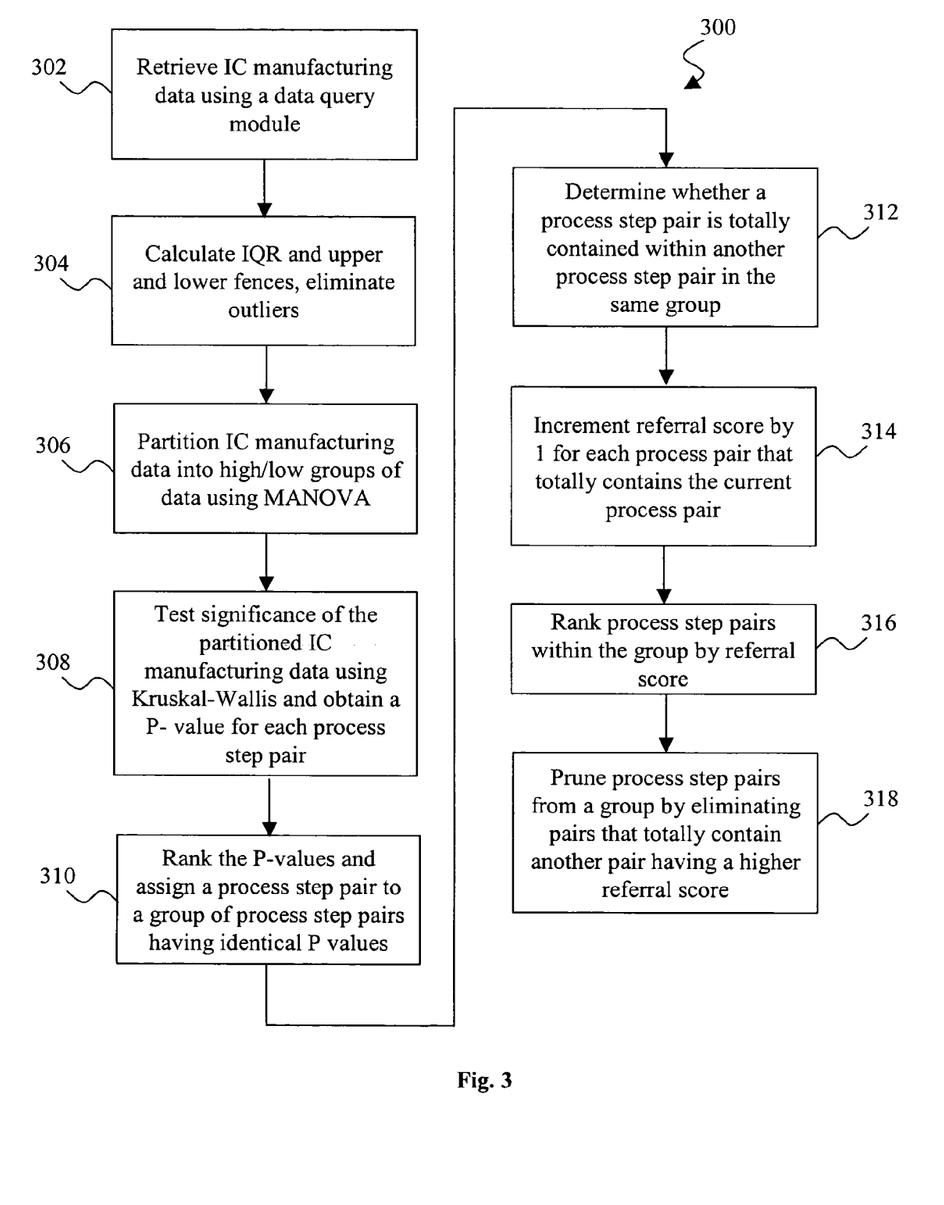
FIG. 3 is a flow chart of a more detailed embodiment of the method of FIG. 1.

Referring to FIG. 3, a method 300 illustrates a more detailed example of the method 100 of FIG. 1. For purposes of illustration, a product is being manufactured within the environment 200 using 426 process steps (not including measurement, dummy, sort-merge, and defect scanning steps). These steps may range from step 001.000 to step xxx.000 (where xxx denotes the ending step), which may be denoted as 001.000–xxx.000 in the following discussion. It is understood that gaps may appear in the numbers due to the excluded measurement, dummy, sort-merge, and defect scanning steps.

In step 302, IC manufacturing data may be retrieved from the MES 214 by the data query module 202 and used to compute the queued-time between all enumerated combinations of pairs of process steps. The data retrieved from the MES may include historical data representing a track-in time and track-out time of each process step, as well as other information such as yield and wafer acceptance test (WAT) data.

As previously described, parameters 204 (e.g., a step window size) may be used to identify and control the retrieval of the data. An adequate step window size may be specified to constrain the maximum width between two steps to be enumerated. For example, specifying a window step size of ten may instruct the data query module 214 to enumerate all possible combinations between a process step and the next nine steps (e.g., current+1, current+2, etc.). It is understood that a step may include a number of consecutive and/or non-consecutive process steps. The window may be repeated for each combination of process steps. An engineer or other user entering the window size may select the step window size in order to limit the volume of output data, although a large amount of data may be analyzed. In the present example, the data query module may also be instructed to ignore unrelated process steps, such as measurement, dummy, and defect-scanning steps, in order to reduce the number of possible combinations between meaningful process steps. To continue the previous example, the data query module retrieves data on the 426 steps and, using the window step size of ten, enumerates approximately 426*10=4260 pairs of queued-time results.

To avoid possible problems caused by data outside of certain ranges, outlier values may be identified and eliminated in step 304. For example, to identify outliers in the present embodiment, the twenty-fifth percentile and the seventy-fifth percentile may be calculated for the data. The difference between the twenty-fifth and seventy-fifth percentiles (e.g., the inter-quartile range (IQR)) may then be calculated. An upper fence value may be calculated as the seventy-fifth percentile plus one and a half times the IQR (e.g., $75^{th}$ percentile+1.5 IQR). Similarly, a lower fence value may be calculated as the twenty-fifth percentile minus one and a half times the IQR (e.g., $25^{th}$ percentile–1.5 IQR). Data values lying above the upper fence and below the lower fence may be identified as outliers and eliminated.

Figure 4:
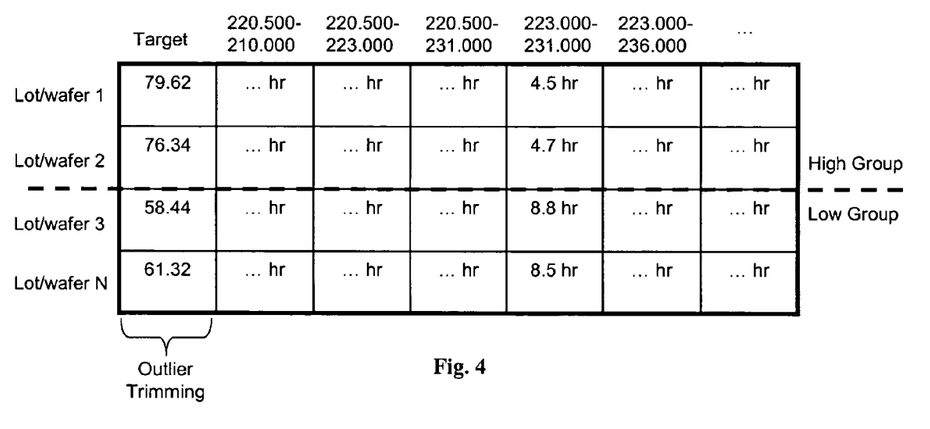
FIG. 4 is a chart illustrating a plurality of exemplary lot/wafer runs divided into high and low groups.

In step 306 and as illustrated in FIG. 4 (which illustrates only a portion of the information retrieved in step 302), the retrieved information may be partitioned into high and low groups using a statistical clustering method, such as MANOVA (multivariate analysis of variance). This operates to determine a best cutting point so that intra-group variation is minimized, while intra-group variation is maximized. An exemplary formula for such a MANOVA clustering (K-means) method is illustrated below:

$$\theta = \sum_{i=1}^{K} \sum_{j=1}^{P} \sum_{m=1}^{n_i} f_{v_{im}} w_{v_{im}} \delta_{v_{im},j} (x_{v_{im},j} - x_{ij})^2$$

where K=cluster number, P=variable, $v_{im}=m^{th}$ observation in $i^{th}$ cluster, f=frequency, w=weight, and δ=0, if missing. Accordingly, the above equation may be used to find a clustering (e.g., a grouping) of an observation so as to minimize the total sum-of-squares within a cluster. For example, in FIG. 4, four times (4.5 hours, 4.7 hours, 8.8 hours, and 8.5 hours) are illustrated for four different lot/wafer runs in the time span for the process step pair 223.000–231.000. These are divided into a high group that includes the 4.5 and 4.7 hour times, and a low group that includes the 8.8 and 8.5 hour times.

Figure 5:
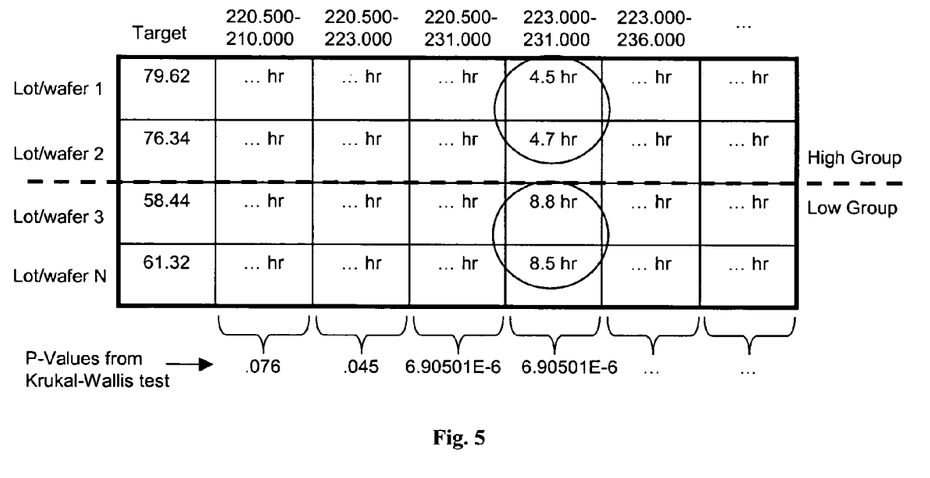
FIG. 5 is a chart illustrating a plurality of exemplary lot/wafer runs with P-values associated with each process step pair.

In step 308 and with additional reference to FIG. 5, a non-parametric (distribution-free) statistical test, which is the Kruskal-Wallis test in the present example, may be used to determine the significance of the difference between the high and low groups partitioned in step 306. The Kruskal-Wallis test may also be applied to determine the significance of the differences between groups of a specified variable. For purposes of illustration, the variable is the queue time between processes.

For each Kruskal-Wallis test on the queued time between high and low groups for a pair of processes, the test produces a statistical P-value signifying the level and/or degree of significant difference between the queue time within the high and low groups. In the present example, smaller P-values indicate a more significant statistical difference between high and low groups. This implies that the queued-time of a pair of process steps with a small P-value may significantly impact the dependent variables, such as WAT or CP yield data.

In step 310, the pairs of process steps may be ranked in order of significance of difference by sorting the P-values, as illustrated below in Table 1. Each process step pair may also be assigned to a group containing process step pairs having identical P-values.

TABLE 1

| Pairs of process steps | P-Value |
|---|---|
| 220.000–231.000 | 6.90501728117798E−6 |
| 220.500–231.000 | 6.90501728117798E−6 |
| 220.500–235.000 | 6.90501728117798E−6 |
| 221.000–231.000 | 6.90501728117798E−6 |
| 221.000–235.000 | 6.90501728117798E−6 |
| 221.000–236.000 | 6.90501728117798E−6 |
| 223.000–231.000 | 6.90501728117798E−6 |
| 223.000–235.000 | 6.90501728117798E−6 |
| 223.000–236.000 | 6.90501728117798E−6 |
| 223.000–237.000 | 6.90501728117798E−6 |
| 001.000–006.000 | 1.29236360497664E−5 |
| 002.000–006.000 | 2.31357849549418E−5 |
| 579.500–594.000 | 2.31357849549418E−5 |
| . | . |
| . | . |
| . | . |

In steps 312, 314, 316, and 318, as multiple process step pairs may have identical or similar P-values (which may indicate statistically identical process step pairs), a trimming treatment may be used to reduce the number of process step pairs that need to be analyzed. For example, in Table 1, the first 10 pairs of process steps have the same P-value of 6.90501728117798E−6. The trimming treatment may be accomplished using ranking and pruning steps, although it is understood that more or fewer steps may be used.

Figure 6:
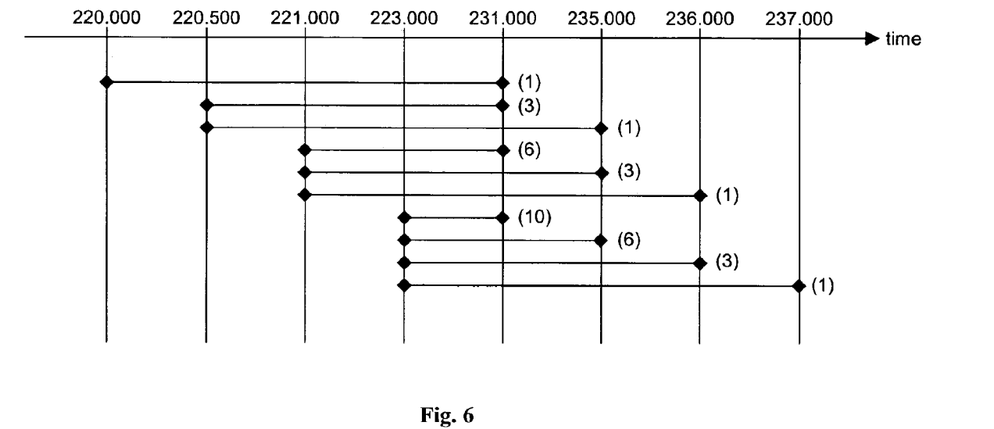
FIG. 6 illustrates a plurality of exemplary semiconductor processing steps and associated referral scores that may be assigned by the method of FIG. 3.

In steps 312, 314, and 316, and with additional reference to FIG. 6, ranking the process step pairs may include identifying and ranking process step pairs within a group (e.g., the process step pairs having the same P-value) using a referral score. As illustrated in FIG. 6, a time span represented by each of the ten pairs having a P-value of 6.90501728117798E−6 may fall within or overlap one or more of the time spans of the other pairs within the group. Using this knowledge, the referral score for each process step pair is determined as follows (steps 312, 314). If the time span of a process step pair "A" is totally contained within the time span of another process step pair "B" within the same group, then increment A's referral score by one. Accordingly, the minimum referral score of any process step pair in the group is one (e.g., itself).

Applying the ranking treatment to FIG. 6 determines a referral score for each pair of process steps (e.g., the parenthetical numbers following each line in FIG. 6). For example, the process step pair 220.000-231.000 is not contained entirely within any other pair of process steps in its group. Accordingly, it is assigned a referral score of 1 (for itself). However, the process step pair 220.500-231.000 is contained within the process step pairs 220.000-231.000 220.500-235.000, and is assigned a referral score of 3 (including itself). The process step pair 223.000-231.000203 is contained within each of the nine other process step pairs and is assigned a referral score of ten, which is the highest of the group.

The process step pairs may then be ranked by their referral scores (step 316), as summarized below in Table 2. It is noted that multiple process step pairs may have an identical referral score, in which case the process step pairs having the same referral score are ranked first by referral score and then according to their time spot in the overall processing flow.

For example, 221.000-231.000 (referral score of 6) occupies a time spot ahead of 223.000-235.000 (also a referral score of 6), and is ranked ahead of 223.000-235.000 in Table 2.

TABLE 2

| Pairs of process steps | P-Value | Referral score |
|---|---|---|
| 223.000–231.000 | 6.90501728117798E−6 | 10 |
| 221.000–231.000 | 6.90501728117798E−6 | 6 |
| 223.000–235.000 | 6.90501728117798E−6 | 6 |
| 220.500–231.000 | 6.90501728117798E−6 | 3 |
| 221.000–235.000 | 6.90501728117798E−6 | 3 |
| 223.000–236.000 | 6.90501728117798E−6 | 3 |
| 220.000–231.000 | 6.90501728117798E−6 | 1 |
| 220.500–235.000 | 6.90501728117798E−6 | 1 |
| 221.000–236.000 | 6.90501728117798E−6 | 1 |
| 223.000–237.000 | 6.90501728117798E−6 | 1 |

In step 318, after the process step pairs in each group are ranked by their referral scores in step 316, the ranked process step pairs may be pruned to reduce the number of process step pairs to be analyzed. As illustrated in Table 2, the first item "A" in a P-value group is the process step pair with the highest referral score in the group. For any other item "B" in the group, the referral score can be no higher than that of item A. Accordingly, if the time span of item B includes the entire time span of item A, then item B may be removed from the group. For example, item B in Table 2 (e.g., the process step pair 221.000-231.000) has a lower referral score than item A (e.g., 223.000-231.000) and totally contains the time span of item A (as illustrated in FIG. 6). Accordingly, item B may be removed from the group, as item B may be labeled as significant because of its inclusion of item A.

It is noted that removing item B in the present example results in a loss of steps (e.g., selecting only the steps 223.000-231.000 from the steps 221.000-231.000 results in a loss of steps 221.000-223.000). However, if the process steps 221.000-223.000 affect the results, they should appear further down in the results list (e.g., in another group), as the data query module would have prepared the steps' queue-time. Accordingly, while it may not be certain at this point in the method 300 whether the process step pair 221.000-223.000 is significant, it is known that its P-value would be smaller than that of the current P-value group (e.g., 6.90501728117798E−6).

In the present example, as every process step pair in the same P-value group as 223.000-231.000 totally contains 223.000-231.000, the only remaining process step pair is 223.000-231.000. Accordingly, as a result of trimming the group of Table 2, Table 1 may be altered as illustrated below in Table 3.

TABLE 3

| Pairs of process steps | P-Value |
|---|---|
| 223.000–231.000 | 6.90501728117798E−6 |
| 001.000–006.000 | 1.29236360497664E−5 |
| 002.000–006.000 | 2.31357849549418E−5 |
| 579.500–594.000 | 2.31357849549418E−5 |
| . | . |
| . | . |
| . | . |

Accordingly, the number of process step pairs to be reviewed may be reduced in number and the more significant process step pairs may be more easily identified, which may result in improvements to the manufacturing process.

For example, assume that the process step 223.000 involves a wet-etch process using HF acid and step 231.000 is a photolithography step. Generally, in the process flow, step 231.000 may be holdable by either an engineer or a customer, and there may be no design documents indicating that 231.000 should not be held. Accordingly, a request may be entered to hold the 231.000 step for about twenty days. However, after the lots are released and undergo further processing, they may show a higher failure rate than normal. By applying the method 300, an engineer may identify the process step pair 223.000-231.000 and realize that the HF acid from step 223.000 needs to be washed away during step 231.000, and that 231.000 should not be holdable. Accordingly, the manufacturing process may be modified to indicate that 231.000 is not holdable or is not holdable past a certain amount of time (e.g., 48 hours).

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A computer-executable method for isolating a process step in a semiconductor manufacturing environment, the method comprising:
   retrieving manufacturing information associated with a fabrication process, wherein the manufacturing information includes a plurality of process step pairs;
   dividing the manufacturing information into at least a high group and a low group using a first statistical method;
   calculating a value for each process step pair by applying a second statistical method to the high and low groups;
   ranking the process step pairs based on their calculated values;
   eliminating at least one redundant process step pair from the ranked process step pairs; and
   identifying the process step by analyzing the remaining ranked process step pairs.

2. The computer-executable method of claim 1 wherein eliminating the redundant process step pair includes calculating a referral score for each process step pair based on each process step pair's relationship with other process step pairs having the same value.

3. The computer-executable method of claim 2 wherein the referral score for a process step pair is modified if the process step pair is contained within another process step pair.

4. The computer-executable method of claim 3 further comprising ranking the process step pairs by referral score.

5. The computer-executable method of claim 3 wherein a process step pair that contains another process step pair having a higher referral score is eliminated.

6. The computer-executable method of claim 1 further comprising altering the fabrication process using the identified process step.

7. The computer-executable method of claim 1 wherein the first statistical method is a statistical clustering method.

8. The computer-executable method of claim 1 wherein the second statistical method is a non-parametric statistical method.

9. The computer-executable method of claim 1 further comprising defining a plurality of parameters for use in retrieving the manufacturing information, wherein the parameters define a step size window and a plurality of process steps that are not to be retrieved.

10. A method for automatically identifying a critical process step in a semiconductor manufacturing environment, the method comprising
    partitioning manufacturing data representing process step pairs into at least a low group and a high group using a first statistical method;
    obtaining a P-value for each process step pair in the manufacturing data based on the low and high groups using a second statistical method;
    ranking the process step pairs based on their P-values and assigning each process step pair to a P-value group of process step pairs having identical P-values;
    calculating a referral score for each process step pair within the P-value group and ranking the process step pairs within the P-value group by their referral scores; and
    pruning process step pairs from the P-value group by eliminating each process step pair that contains another process step pair having a higher referral score.

11. The method of claim 10 further comprising calculating upper and lower fences based on an inter-quartile range and eliminating values lying above the upper fence and below the lower fence.

12. The method of claim 10 wherein calculating the referral score for a process step pair includes determining whether a time span occupied by the process step pair is contained within a time span occupied by another process step pair in the P-value group.

13. The method of claim 12 wherein the referral score for the process step pair is incremented if the time span occupied by the process step pair is contained within the time span occupied by another process step pair in the P-value group.

14. The method of claim 10 wherein the process step pairs are ranked in ascending order based on their P-values and are ranked in descending order based on their referral scores.

15. The method of claim 10 further comprising analyzing the pruned process step pairs to identify the critical process step.

16. The method of claim 10 further comprising:
    defining a step size window; and
    retrieving the manufacturing data using the step size window.

17. The method of claim 10 wherein the manufacturing data is retrieved from a manufacturing execution system.

18. The method of claim 10 further comprising defining at least one process step that is to be excluded from the manufacturing data.

19. The method of claim 10 wherein the first statistical method is a statistical clustering method.

20. The method of claim 19 wherein the first statistical method is a multivariate analysis of variance (MANOVA) method.

21. The method of claim 10 wherein the second statistical method is a non-parametric statistical method.

22. The method of claim 21 wherein the second statistical method is a Kruskal-Wallis method.

23. A system for retrieving information from a semiconductor manufacturing environment and identifying a critical process step based on the retrieved information, the system comprising:

a manufacturing execution system (MES) configured to manage a plurality of process steps;

a data query module associated with a plurality of parameters, wherein the parameters define the information to be retrieved from the MES; and a plurality of computer-executable instructions, including:

instructions for partitioning manufacturing data representing process step pairs into at least a low group and a high group using a first statistical method;

instructions for obtaining a P-value for each process step pair in the manufacturing data based on the low and high groups using a second statistical method;

instructions for ranking the process step pairs based on their P-values and assigning each process step pair to a P-value group of process step pairs having identical P-values;

instructions for calculating a referral score for each process step pair within the P-value group and ranking the process step pairs within the P-value group by their referral scores; and instructions for pruning process step pairs from the P-value group by eliminating each process step pair that contains another process step pair having a higher referral score.

24. The system of claim 23 wherein the instructions for calculating the referral score for a process step pair include instructions for determining whether a time span occupied by the process step pair is contained within a time span occupied by another process step pair in the P-value group.

25. The method of claim 24 wherein the referral score for the process step pair is incremented if the time span occupied by the process step pair is totally contained within the time span occupied by another process step pair in the P-value group.

* * * * *